United States Patent [19]

Myers

[11] Patent Number: 4,718,327
[45] Date of Patent: Jan. 12, 1988

[54] REACTION MECHANISM FOR BRAKE BOOSTER

[75] Inventor: Lawrence R. Myers, South Bend, Ind.

[73] Assignee: Allied Corporation, Morristown, N.J.

[21] Appl. No.: 932,825

[22] Filed: Nov. 20, 1986

Related U.S. Application Data

[62] Division of Ser. No. 803,359, Dec. 2, 1985, Pat. No. 4,672,883.

[51] Int. Cl.$^4$ .............................................. F15B 9/10
[52] U.S. Cl. .............................. 91/369 B; 91/376 R; 91/379; 92/84
[58] Field of Search ............. 91/369 A, 369 B, 376 R, 91/379; 92/84; 60/552, 553, 554

[56] References Cited

U.S. PATENT DOCUMENTS

| | | | |
|---|---|---|---|
| 2,858,804 | 11/1958 | Banker | 92/84 X |
| 3,049,100 | 8/1962 | Rike | 91/369 B X |
| 3,082,745 | 3/1963 | Brooks | 91/369 B |
| 3,628,422 | 12/1971 | Acre | 91/376 R X |
| 4,069,742 | 1/1978 | Gephart et al. | 91/369 A |
| 4,148,247 | 4/1979 | Schubert | 91/369 B X |

Primary Examiner—Robert E. Garrett
Assistant Examiner—Mark A. Williamson
Attorney, Agent, or Firm—Leo H. McCormick, Jr.; Ken C. Decker

[57] ABSTRACT

A reaction mechanism for use in a vacuum brake booster (10). A lever (86) transfers a reaction force from a first plunge (64) into a second plunger (110) to provide an operator with an indication of the output force being produced in response to an input force. A resilient member (118) urges a first connecting member (116) into engagement with the lever (86). When a predetermined input force is applied, the reaction force overcomes the resilient member (118) and thereafter allows the input force to be directly transmitted through a second connecting member (122) and added to the output force.

4 Claims, 5 Drawing Figures

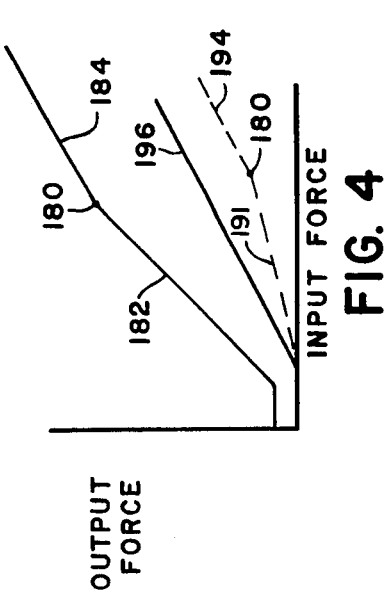
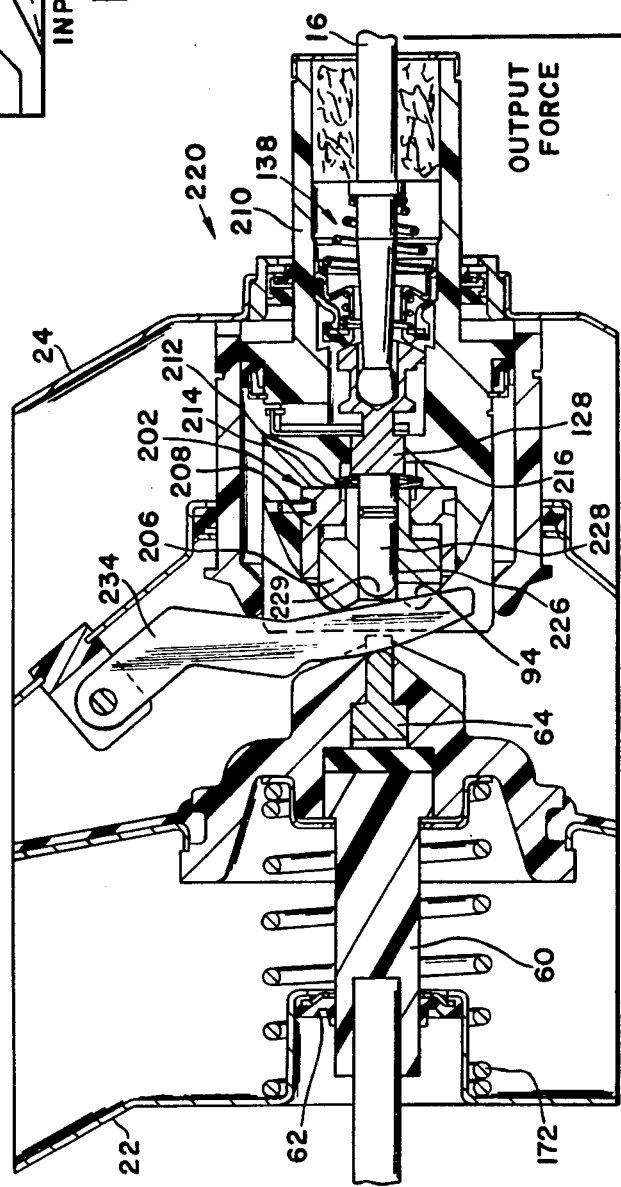

REACTION MECHANISM FOR BRAKE BOOSTER

This is a division, of application Ser. No. 06/803,359, filed Dec. 2, 1985, now U.S. Pat. No. 4,672,883.

This invention relates to a reaction mechanism for a vacuum brake booster. The reaction mechanism includes a first connecting member, a lever mechanism and a second connecting member. The lever mechanism which is fixed to a support transfers a reaction force from an output member to balance an input force applied to a control member. The first connecting member is urged into engagement with the lever mechanism by a spring. When the reaction force reaches a predetermined value, the spring is overcome and the second connecting member thereafter directly transfers the input force through the lever as an additive force for the output force developed in the vacuum booster as a result of a pressure differential created therein.

Various vacuum brake boosters have been provided with internal force multipliers to modify the output force produced through movement of a wall by a pressure differential. In U.S. Pat. No. 4,086,842 a lever had a first end fixed to a front shell and a second end pivotally attached to a movable wall. A pin attached to the output push rod moved in a slot to transfer the force produced in the wall into the output member. Unfortunately, this type of construction when operating under certain conditions could produce more frictional resistance than would be acceptable to customers.

In copending U.S. patent application No. 795,304, now U.S. Pat. No. 4,679,491, relating to a tandem vacuum brake booster, first internal levers are used to both transfer the output force from a second wall into the output member to be combined with the output force from a first wall and second internal levers are used to carry a reaction force to the control member to balance the input force applied thereto. This structure operates in a manner completely satisfactory to most operators; however, when the maximum output force produced by the pressure differential is achieved any additional manual input force is proportionally reduced by the lever before being combined with the output of the walls. During a no power condition the reduction in manual input would be most noticeable and require an operator to supply additional force to overcome such loss before a brake application could be perfected.

The reaction mechanism disclosed herein has a first connection member which is biased into engagement with a reaction lever by a spring. During a brake application, the reaction force is carried back through the reaction lever to balance the input force applied to a control member. When the maximum output force capable of being produced by the input force and pressure differential is reached, the reaction force overcomes the spring and at this time a second connection member forms a solid link through the reaction lever between the control member and the output member of the vacuum brake booster. Thereafter, any additional manual input is directly added to the output force to effect the brake application.

During a manual brake application, after the reaction spring is overcome, the manual input force is transmitted through the second connection member to the output member without further modification. More importantly, the initial input force applied to the control valve acts through the lever to move the output member at a different rate than the input member to compensate for losses experienced with a brake system such as the retraction travel in the wheel cylinders or calipers.

An advantage of this invention occurs through the selection of the lever ratio through which the reaction force and initial input force is transmitted from a control member and an output member.

A further object of this invention is to provide a vacuum brake booster with a reaction mechanism having a first connection member whereby forces are transmitted between a movable output member and a control member through a lever mechanism. When a maximum output force is produced in the booster, a reaction force acts on the first connection member to shift any further input force through a second connection member to the output member without being modified by the lever arrangement.

These advantages and objects should be apparent from viewing the drawings wherein:

FIG. 3 is a sectional view of a tandem vacuum brake booster having a reaction mechanism made according to the principles of this invention;

FIG. 4 is a graph comparing input force to output force produced by a vacuum brake booster made according to the principles of this invention with a prior art vacuum brake booster of the same size; and FIG. 5 is a graph comparing input travel to output force produced by a brake booster produced in accordance with this invention to a conventional brake booster.

Figure 1:
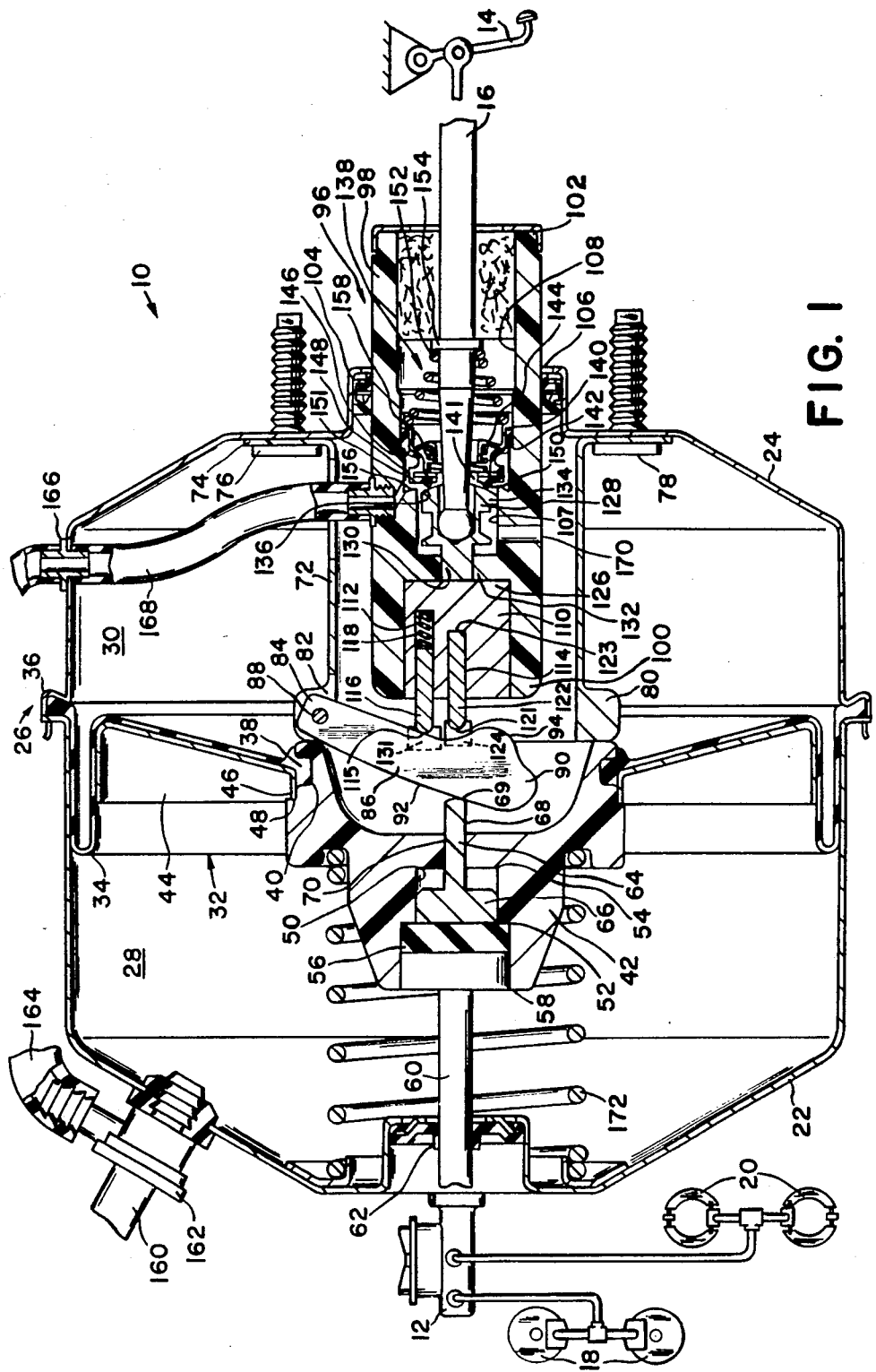
FIG. 1 is a section view of a vacuum brake booster having a reaction mechanism made according to the principles of this invention.

The brake system shown in FIG. 1 has a vacuum brake booster 10 which is connected to a master cylinder 12. An input force applied to pedal 14 by an operator is transmitted through push rod 16 to operate the vacuum brake booster 10 and provide master cylinder 12 with an operational force to move pistons therein which supply the wheel brakes 18 and 20 on a vehicle with pressurized fluid to effect a brake application.

The vacuum brake booster 10 has a front shell 22 connected to a rear shell 24 by a conventional twist lock arrangement 26 to form a housing with a cavity therein. The cavity is divided into a front chamber 28 and a rear chamber 30 by a wall means 32. The wall means 32 includes a diaphragm 34 with a first bead 36 held between the front shell 22 and rear shell 24 by the twist lock arrangement 26 and a second bead 38 that is located in groove 40 on hub 42. A backing plate 44 for the diaphragm 34 has an annular lip 46 that is held against shoulder 48 on hub 42 by bead 38.

Hub 42 has a stepped bore 50 with a first shoulder 52 and a second shoulder 54. A rubber disc 56 is located in bore 50 adjacent shoulder 52 by head 58 on the output push rod 60 that passes through bearing seal 62 to provide master cylinder 12 with an input force.

A first plunger 64 has a head 66 located in bore 50 and a stem 68 that passes through opening 70 in hub 42 into chamber 30.

A support member 72 has a cylindrical body with an annular flange 74 that is fixed to shell 24 by fasteners 76 and 78. A ring 80 which surrounds cylinder 72 has a vertical slot 82 that receives end 84 of a lever 86. A pin 88 attaches end 84 to the support member and allows the lever 86 to pivot in a vertical plane substantially parallel to slot 82. End 90 of lever 86 has a first surface 92 that engages end 69 on stem 68 of the first plunger 64 and a second surface 94 that is cammed between the first end 84 and second end 90. The lever 86 transfers the reaction force from plunger 64 into the control member 96.

The control member 96 has a cylindrical body 98 with a first end 100 and a second end 102. The second end 102 extends through bearing seal 104 located in opening 106 in the rear shell 24. The cylindrical body 98 has a stepped bore 108 that extends from the first end 100 to the second end 102.

A reaction plunger 110 located in bore 108 has a first bore 112 and a second bore 114. A first pin 116 located in bore 112 is urged against cam surface 94 by a spring 118. Pin 116 has a yoke 131, only one side of which is shown in phantom, on the end thereof that engages the sides of lever 86 to maintain the axial alignment of pin 116, lever 86 and stem 64. A second pin 122 located in bore 114 has a yoke 124, only one side of which is shown in phantom, that engages the sides of lever 86 but in the rest position shown in FIG. 1 does not engage cam surface 94. The base 126 on plunger 110 engages valve plunger 128 connected to push rod 16. Valve plunger 128 has a first bearing surface 130 that engages section 132 of bore 108 and second bearing surface 134 that engages bore 108 to hold the arcuate atmospheric seat 136 in axial alignment within bore 108.

A poppet arrangement 138 has a first bead 140 that is held against a shoulder 142 by a retainer 144, a flexible section 146 and a free end 148. The free end 148 has a substantially flat surface with an annular projection 150 that extends toward atmospheric seat 136. A first spring 152 located between retainer 144 and shoulder 154 on push rod 16 urges atmospheric seat 136 on plunger 128 toward annular projection 150 and away from vacuum seat 156. A second spring 158 located between retainer 144 and the free end 148 urges the annular projection 150 against the arcuate atmospheric seat 136 to seal section 107 of bore 108 from the atmosphere.

In operation, wherein a vehicle equipped with a brake booster 10 has an internal combustion engine, vacuum is produced and supplied by conduit 160 to check valve 162. A second conduit 164 attached to check valve 162 extends through grommet 166 in the rear shell 24 and is connected by a flexible tube 168 to section 107 of bore 108 in cylindrical member 98. Vacuum produced by the manifold evacuates air from the front chamber 28 and from the rear chamber 30 by way of passage 170, section 107 of bore 108, conduits 168 and 164. With vacuum present in chambers 28 and 30, return spring 172 acts on hub 42 to move wall 32 against ring 80 on support member 72. As shown in FIG. 1, spring 118 holds pin 116 against cam surface 94 on lever 86 to move the first plunger 64 against reaction disc 56.

Figure 2:
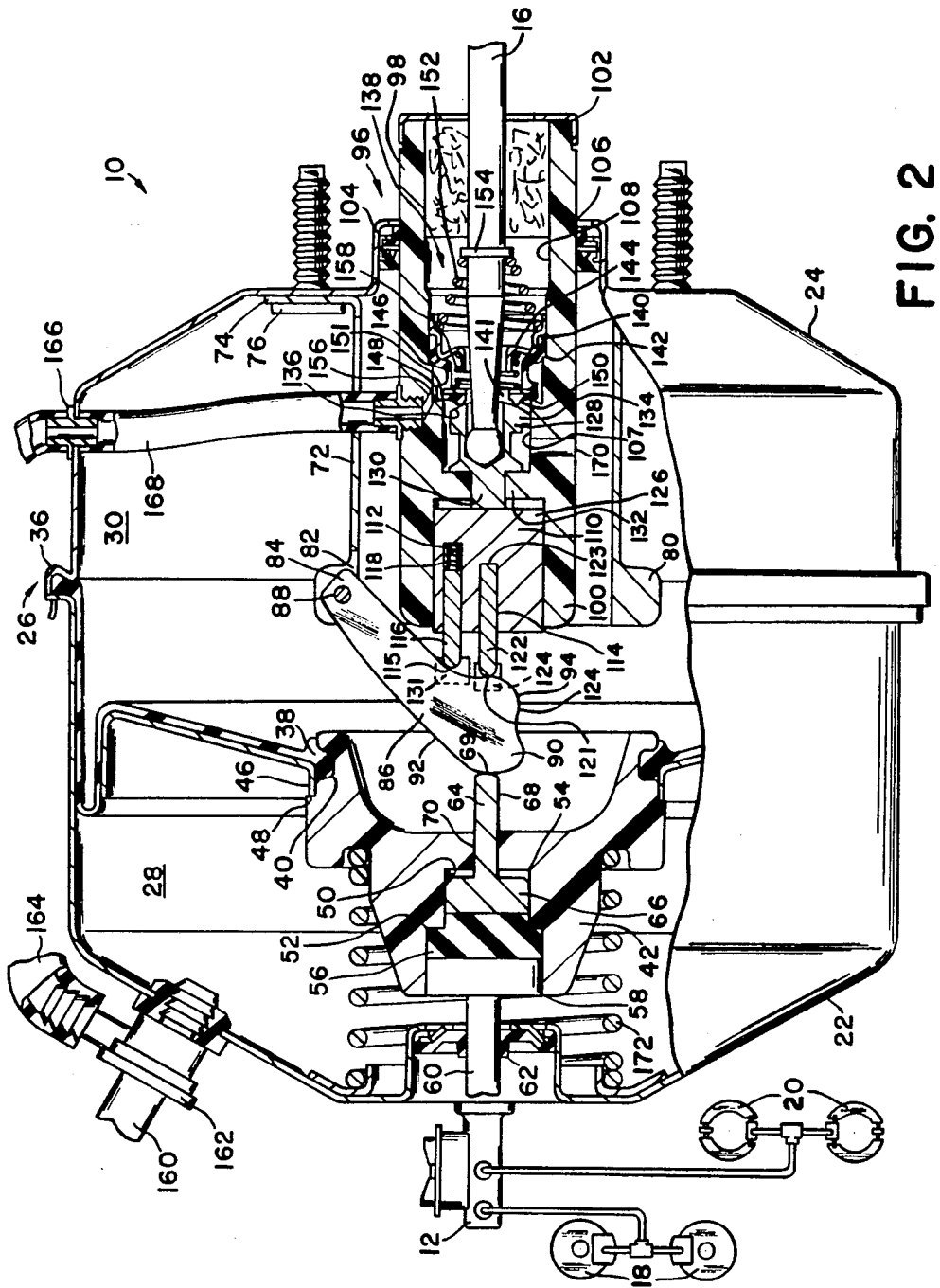
FIG. 2 is a sectional view of the vacuum brake booster in FIG. 1 in the operational condition.

When an operator desires to effect a brake application an input force is applied to brake pedal 14. This input force imports linear movement to push rod 16 which moves plunger 128 which allows spring 158 to move face 151 on end 148 against vacuum seat 156 and interrupt vacuum communication to chamber 30 by way of section 107 of bore 108 and passage 170 as shown in FIG. 2. Movement of plunger 128 is transferred into reaction plunger 110 and through spring 118 into pin 116. Movement of pin 116 to plunger 66 is modified by lever 86 by a ratio of the distance between the engagement points of end 115 on pin 116 and end 69 on stem 68 with respect to pivot pin 88. This manual input is transmitted through reaction disc 56 to provide output push rod 60 with an initial movement such that the compensator ports in master cylinder 12 are closed. Further movement of plunger 128 moves face 136 away from annular projection 150 while at the same time surface 151 is urged into engagement with vacuum seat 156 to allow air to enter chamber 30 by flowing in bore 108, through opening 141 in free end 148 of the poppet 138, into section 107 and out passage 170. With air in chamber 30 and vacuum in chamber 28, a pressure differential is created across wall 32. This pressure differential produces a force that is transferred into hub 42 and through the resilient disc 56 to the output push rod 60 for operating the master cylinder 12. The opposition to movement of push rod 60 creates a reaction force which is transmitted through disc 56 to move head 66 on plunger 64. Movement of stem 68 is carried through lever 56 to pin 116 for balancing the input force applied to push rod 16.

When the maximum output produced by the pressure differential between vacuum in chamber 28 and air in chamber 3U is reached a condition called "vacuum runout" is produced. This is illustrated by point 180 on curve 182 in FIG. 4 showing the relationship between input force applied to push rod 16 and the output force transferred through push rod 60. Any further output force from the brake booster 10 is achieved through the manual input applied to pedal 14.

In the brake booster 10 illustrated in FIG. 2 when vacuum runout occurs, spring 118 is collapsed to allow end 121 to engage cam surface 94 and end 123 to engage the bottom of bore 114. Thereafter, pin 122 forms a solid link between plunger 110 and plunger 64 through the body of lever 86. Thus, the input force applied to push rod 16 is directly transferred to plunger 64 without being modified by the lever ratio illustrated by 184. Both the brake booster 10 and a conventional booster have the same input force to output force relationship shown by curves 182 and 184.

Besides the additional output being achieved by this arrangement. FIG. 5 shows the relationship that occurs between pedal travel and output force for a conventional brake booster and the brake booster 10. Curve 186 shows the typical travel experienced by an input push rod for a conventional brake booster. When vacuum runout occurs at point 180, the travel associated with manual input follows line 190. Curve 192 illustrates the reduced travel required by push rod 16 in brake booster 10 to achieve the same output up to vacuum runout. Thereafter, the manual input, since a direct link occurs between push rod 16 and plunger 64 is established, follows curve 190' which has the same slope as line 190.

When the input force applied to pedal 14 terminates, spring 152 moves face 136 on valve plunger 128 into engagement with projection 150 on end 148 of poppet 138 to interrupt the flow of air through bore 108. Further movement of plunger 128 moves face 151 away from seat 156 to allow vacuum to evacuate air from chamber 30. As air is evacuated from chamber 30, the pressure differential across wall 32 is eliminated and spring 172 moves hub 42 against stop or ring 80 on support 72 to establish the rest position shown in FIG. 1.

In the event that vacuum is unavailable for evacuating air from chambers 28 and 30, a manual brake application can be achieved since spring 118 is designed to collapse when a force equal to vacuum runout is applied to the pedal. Thereafter the solid link transmits the input force to the output member. The no power output to input force is illustrated in FIG. 4 for brake booster 10 by curve 191. When the vacuum runout point 180 is reached, the output to input follows curve 194 which is parallel to curve 196 for a conventional booster. Similarly, the input travel for a no power output is illustrated in FIG. 5 for brake booster 10 by curve 197 up to runout and curve 190 thereafter and by curve 200 for a conventional booster.

In the brake booster 220 shown in FIG. 3, the structure of the tandem unit is identical to that disclosed in U.S. patent application 795,304 with the exception of the second plunger arrangement 202 through which the reaction forces are transmitted to the valve arrangement 138.

The second plunger arrangement 202 has a first force connecting member 206 that is carried in a sleeve 208 attached to cylindrical body 210 that carries the control valve 138. First and second frusto conical springs 212 and 214 located in bore 216 separate valve plunger 128 from connecting member 206. The first connecting member 206 has an axial bore 226 with a pin or second connecting member 228 located therein. A gap exists between the second connecting member 228 and cam surface 94 on the reaction lever 234.

The operation of tandem brake booster 220 is similar to that of brake booster 10. When vacuum runout occurs, reaction force transmitted through reaction lever 234 will have collapsed springs 212 and 214 to bring end 229 of pin 228 into contact with cam surface 94. Thereafter the input force applied to push rod 16 is transferred through the solid link formed by plunger 128, pin 228, reaction lever 234 into plunger 64. The same type improvement in input travel shown in FIG. 5 for brake booster 10 is achieved for brake booster 220.

I claim:

1. A reaction mechanism for a brake booster having a wall that moves within a cavity in response to a pressure differential to produce an output force corresponding to an input force applied to a control member by an input member and lever means through which a reaction force is transferred from said wall to said control member to balance said input force, the improvement comprising:

a first plunger carried by said wall and having a projection that extends therefrom toward said control member;

a second plunger carried by said control member and connected to said input member;

said lever means having an arm with a first end fixed to a support and a second end free to move in an arc as a function of the movement of said wall, said projection engaging said lever adjacent a said second end, said arm having a cam surface located between said first and second end;

first force transmitting means carried by said second plunger;

resilient means for urging said first force transmitting means into constant engagement with said cam surface on said arm; and second force transmitting means carried by said second plunger, said input force applied to said control member being transmitted from said second plunger into said first plunger through the first force transmitting member and lever means, said reaction force overcoming said resilient means when a predetermined input force is produced to bring said second force transmitting means into engagement with said cam surface and thereafter transfer said input force directly through said lever means into said first plunger for moving said wall during the development of said output force.

2. The reaction mechanism as recited in claim 1 wherein said cam surface is selected as a function of the spring rate of said resilient means such that the transition of the input force from said first force transmitting means to the second force transmitting means follows a smooth curve.

3. The reaction mechanism as recited in claim 1 wherein said first force transmitting means includes:

a first cylindrical member that extends from a first head, said first head having a first slot therein, said arm being located in said first slot to maintain said first cylindrical member in alignment with said first plunger.

4. The reaction mechanism as recited in claim 3 wherein said second force transmitting means includes:

a second cylindrical member that extends from a second head, said second head having a second slot therein, said arm being located in said second slot to maintain said second cylindrical member in alignment with said first plunger.

* * * * *